(12) United States Patent
Curcic (10) Patent No.: US 10,837,776 B2
(45) Date of Patent: Nov. 17, 2020

(54) METHOD FOR OPERATING A ROTATION RATE SENSOR USING DIFFERENT FREQUENCIES

(71) Applicant: Robert Bosch GmbH, Stuttgart (DE)

(72) Inventor: Michael Curcic, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 489 days.

(21) Appl. No.: 15/685,536

(22) Filed: Aug. 24, 2017

(65) Prior Publication Data
US 2018/0058852 A1    Mar. 1, 2018

(30) Foreign Application Priority Data
Aug. 25, 2016  (DE) .......................... 10 2016 215 975

(51) Int. Cl.
*G01C 19/5719* (2012.01)
*G01C 19/5776* (2012.01)
*G01P 15/125* (2006.01)
*G01P 15/097* (2006.01)
*G01C 19/5684* (2012.01)
G01C 19/5656 (2012.01)
G01C 19/5726 (2012.01)
G01C 19/5747 (2012.01)

(52) U.S. Cl.
CPC ..... *G01C 19/5719* (2013.01); *G01C 19/5684* (2013.01); *G01C 19/5776* (2013.01); *G01P 15/097* (2013.01); *G01P 15/125* (2013.01); G01C 19/5656 (2013.01); G01C 19/5726 (2013.01); G01C 19/5747 (2013.01)

(58) Field of Classification Search
CPC .............. G01C 19/567; G01C 19/5677; G01C 19/5684; G01C 19/5719; G01C 19/5733; G01C 19/5755
USPC ........................... 73/504.04, 504.12, 504.14
See application file for complete search history.

(56) References Cited

U.S. PATENT DOCUMENTS

| 5,016,072 A  * | 5/1991 | Greiff ................ G01C 19/5719 257/418 |
| 7,984,648 B2 * | 7/2011 | Horning .................. G01P 15/18 73/504.12 |
| 10,260,879 B2 * | 4/2019 | Maul .................... G01C 19/574 |
| 2007/0028686 A1 * | 2/2007 | Wyse ................. G01C 19/5719 73/504.12 |

(Continued)

*Primary Examiner* — Nathaniel J Kolb
(74) *Attorney, Agent, or Firm* — Norton Rose Fulbright US LLP; Gerard Messina (57) ABSTRACT

A method for operating a micromechanical component (a rotation rate sensor), in which a first AC electrical voltage, having a first frequency, is applied to a drive-electrode so that an oscillation apparatus is deflected parallel to a deflection direction by the drive-electrode; a second AC electrical voltage, having a second frequency, is applied to a detection-electrode so that a force effect on the oscillation apparatus perpendicularly to the detection direction is detected by the drive-electrode, a third AC electrical voltage, having a third frequency differing from the first, is applied to the drive-electrode so that a deflection of the oscillation apparatus parallel to the deflection direction is detected by the drive-electrode; and/or that a fourth AC electrical voltage, having a fourth frequency differing from the second, is applied to the detection-electrode to exert a further force effect, opposite to the force effect, on the oscillation apparatus.

12 Claims, 4 Drawing Sheets

(56) References Cited

U.S. PATENT DOCUMENTS

| | | | |
|---|---|---|---|
| 2010/0300203 A1* | 12/2010 | Gotoh | G01P 15/14 |
| | | | 73/504.15 |
| 2011/0259100 A1* | 10/2011 | Chen | G01C 19/5726 |
| | | | 73/504.12 |
| 2014/0360265 A1* | 12/2014 | Jomori | G01C 19/5747 |
| | | | 73/504.12 |
| 2016/0356599 A1* | 12/2016 | Maul | G01C 19/5747 |

* cited by examiner

METHOD FOR OPERATING A ROTATION RATE SENSOR USING DIFFERENT FREQUENCIES

RELATED APPLICATION INFORMATION

The present application claims priority to and the benefit of German patent application no. 10 2016 215 975.5, which was filed in Germany on Aug. 25, 2016, the disclosure of which is incorporated herein by reference.

FIELD OF THE INVENTION

The invention proceeds from a method for operating a micromechanical component.

BACKGROUND INFORMATION

Such a method is commonly known. Capacitive MEMS rotation rate sensors are generally operated in such a way that a seismic mass is excited to move resonantly parallel to a deflection direction. When a rotation rate is applied to the MEMS rotation rate sensor, the seismic mass is deflected orthogonally to the driving direction as a result of a Coriolis force. As a rule, the seismic mass constitutes a common counter-electrode with respect to corresponding drive electrodes or detection electrodes.

SUMMARY OF THE INVENTION

The object of the present invention is to furnish a method for operating a micromechanical component in a simple and inexpensive manner, which method in particular enables the operation of micromechanical components of particularly space-saving and resource-conserving configuration.

The object may be achieved in that
 a third AC electrical voltage, having a third frequency differing from the first frequency, is applied to the drive electrode in such a way that a deflection of the oscillation apparatus parallel to the deflection direction is detected by the drive electrode; and/or that
 a fourth AC electrical voltage, having a fourth frequency differing from the second frequency, is applied to the detection electrode in such a way that a further force effect, acting oppositely to the force effect, is exerted on the oscillation apparatus by the detection electrode.

What is advantageously made possible by the use of the third AC electrical voltage, having a third frequency differing from the first frequency, is that the oscillation apparatus can be deflected by the drive electrode and simultaneously that a deflection of the oscillation apparatus by the drive electrode can be detected.

Furthermore, what is advantageously made possible by the use of the fourth AC electrical voltage, having a fourth frequency differing from the second frequency, is that a force effect on the oscillating apparatus can be detected by the detection electrode and simultaneously that a further force effect, acting oppositely to the force effect, can be exerted on the oscillation apparatus by the detection electrode.

The result is that it is advantageously possible, with the aid of the method according to the present invention, to dispense with drive detection electrodes or drive detection apparatuses, and/or force feedback electrodes or force feedback apparatuses, and at the same time to furnish the respective functions of drive detection electrodes or drive detection apparatuses, and/or force feedback electrodes or force feedback apparatuses.

The substrate area required by the micromechanical component can thereby advantageously be considerably reduced. It is thereby possible to furnish lighter and more compact micromechanical components that, in particular, require less material; and costs in the context of manufacturing can be considerably reduced thanks to an increased number of items per unit of wafer area.

Alternatively or additionally, the space saved by way of the method according to the present invention as compared with the existing art can also be used for an enlargement of drive chambers, which results in lower operating voltages.

The present invention thus furnishes a method for operating a micromechanical component in a simple and inexpensive manner, which method in particular enables the operation of micromechanical components of particularly space-saving and resource-conserving configuration.

In conjunction with the present invention, the term "micromechanical component" is to be understood in such a way that the term encompasses both micromechanical components and microelectromechanical components. The micromechanical component may be a rotation rate sensor or an acceleration sensor. Particularly, the micromechanical component may encompass a rotation rate sensor element or a sensor core for measuring a rotation rate applied to the micromechanical component. Alternatively or additionally, the micromechanical component may encompass an acceleration sensor element or a sensor core for measuring an acceleration applied to the micromechanical component.

An AC voltage may encompass a time-independent DC voltage portion and a time-dependent AC voltage portion, the DC voltage portion particularly being positive, negative, or zero.

The drive electrode may be disposed spaced away, parallel to the deflection direction, from the oscillation apparatus. Particularly, a projection of the drive electrode and a projection of the oscillation apparatus may respectively overlap on a projection plane extending perpendicularly to a principal extension plane of a substrate of the micromechanical component and parallel to the deflection direction. The detection electrode may furthermore be disposed spaced away, perpendicularly to the deflection direction, from the oscillation apparatus.

The oscillation apparatus may encompass a seismic mass or a Coriolis mass.

The deflection direction may furthermore be oriented parallel to the principal extension plane. Alternatively, the deflection direction may be oriented perpendicularly to the principal extension plane.

Advantageous embodiments and refinements of the invention may be gathered from the further descriptions herein and from the description with reference to the drawings.

According to a refinement, provision is made that the micromechanical component is operated in such a way that the second frequency is identical to the third frequency. What is advantageously made possible thereby is that one common frequency, or one carrier frequency, can be respectively used for two detection channels.

According to a refinement, provision is made that the micromechanical component is operated in such a way that the first frequency is identical to the fourth frequency. What is advantageously made possible thereby is that one common frequency, or one further carrier frequency, can be respectively used for the drive motion and for a detection channel.

According to a refinement, provision is made that a further first AC electrical voltage, having the first frequency, is applied to a further drive electrode of the micromechanical component in such a way that the oscillation apparatus of the micromechanical component is deflected parallel to the deflection direction by the further drive electrode.

The further first AC electrical voltage may be phase-shifted by a value equal to 180°, or to n, with respect to the first AC electrical voltage. What is advantageously made possible thereby is that the oscillation apparatus can be deflected particularly homogeneously.

According to a refinement, provision is made that a further second AC electrical voltage, having the second frequency, is applied to a further detection electrode of the micromechanical component in such a way that the force effect on the oscillation apparatus perpendicular to the deflection direction is detected by the further detection electrode. What is advantageously made possible thereby is that the force effect can be detected particularly homogeneously.

According to a refinement, provision is made that a further third AC electrical voltage, having the third frequency, is applied to the further drive electrode in such a way that the deflection of the oscillation apparatus parallel to the deflection direction is detected by the further drive electrode. What is advantageously made possible thereby is that the deflection can be detected particularly homogeneously.

According to a refinement, provision is made that a further fourth AC electrical voltage, having the fourth frequency, is applied to the further detection electrode in such a way that a third force effect, acting oppositely to the force effect, is exerted on the oscillation apparatus by the further detection electrode. The further fourth AC electrical voltage may be phase-shifted by an amount equal to 180°, or to n, with respect to the fourth AC electrical voltage. What is advantageously made possible thereby is that with the aid of the third force effect on the oscillation apparatus, the force effect can be compensated for particularly homogeneously or exactly.

According to a refinement, provision is made that a current flow to the oscillation apparatus is evaluated by an evaluation unit of the micromechanical component in such a way that the force effect on the oscillation apparatus perpendicularly to the deflection direction is ascertained. The result is that a particularly advantageous refinement, with which additional force feedback electrodes can be dispensed with, is furnished.

According to a refinement, provision is made that a current flow to the oscillation apparatus is evaluated by an evaluation unit of the micromechanical component in such a way that the deflection of the oscillation apparatus parallel to the deflection direction is ascertained. The result is that a particularly advantageous refinement, with which additional drive detection electrodes can be dispensed with, is furnished.

A further subject of the present invention is [a] circuit assemblage for operating a micromechanical component, in particular using a method as recited in one of the preceding claims, the circuit assemblage being embodied in such a way that a first AC electrical voltage, having a first frequency, is applicable to a drive electrode of the micromechanical component in such a way that an oscillation apparatus of the micromechanical component is deflected parallel to a deflection direction by the drive electrode; the circuit assemblage being embodied in such a way that a second AC electrical voltage, having a second frequency, is applicable to a detection electrode of the micromechanical component in such a way that a force effect on the oscillation apparatus perpendicularly to the detection direction is detected by the drive electrode, wherein the circuit assemblage is embodied in such a way that a third AC electrical voltage, having a third frequency differing from the first frequency, is applicable to the drive electrode in such a way that a deflection of the oscillation apparatus parallel to the deflection direction is detected by the drive electrode; and/or the circuit assemblage is embodied in such a way that a fourth AC electrical voltage, having a fourth frequency differing from the second frequency, is applicable to the detection electrode in such a way that a further force effect, acting oppositely to the force effect, is exerted on the oscillation apparatus by the detection electrode.

The aforesaid advantages of the method according to the present invention are also correspondingly valid for the circuit assemblage according to the present invention.

In the various Figures, identical parts are always labeled with the same reference characters and are therefore also, as a rule, respectively recited or mentioned only once.

DETAILED DESCRIPTION

Figure 1:
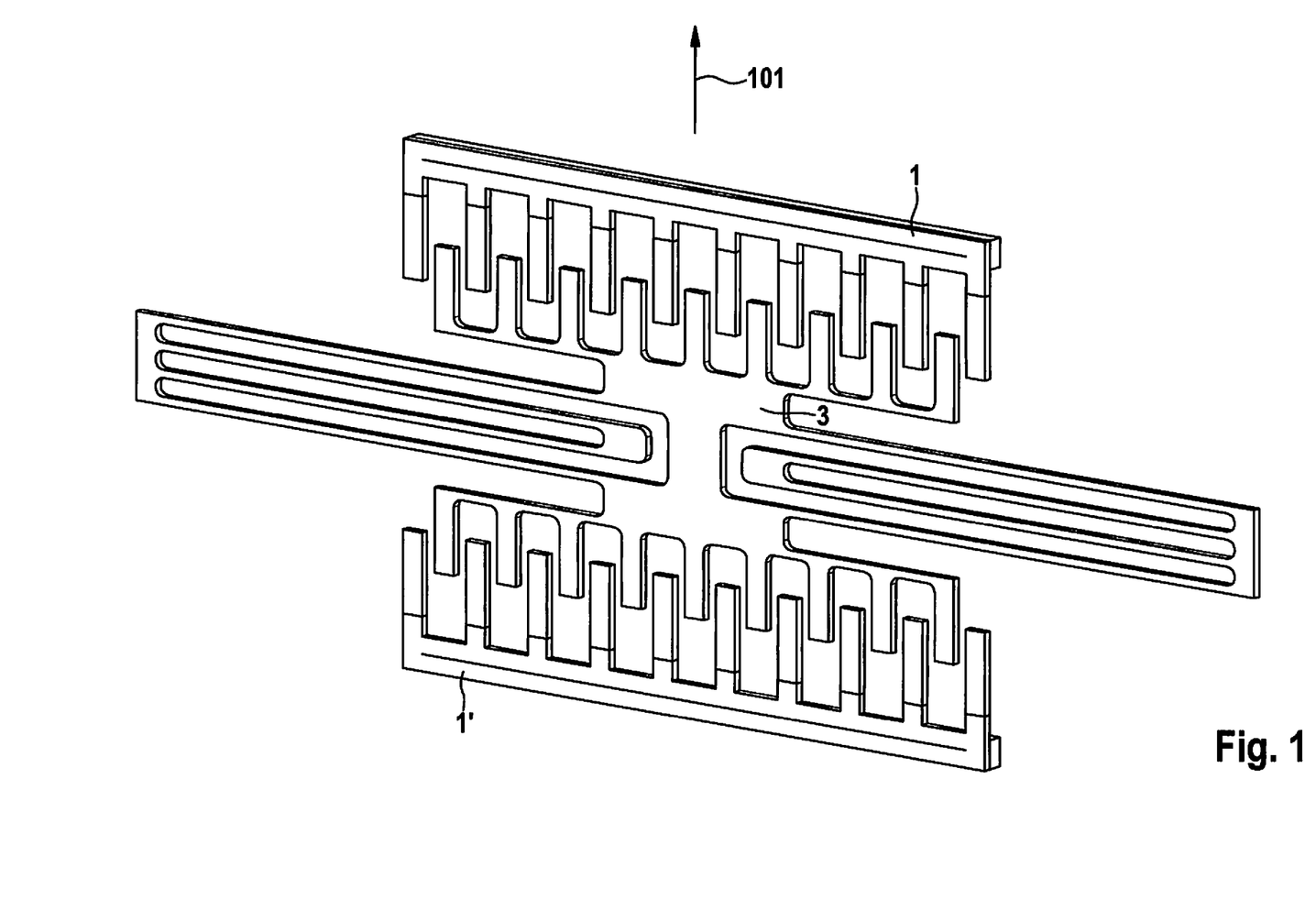
FIG. 1 schematically depicts a portion of a micromechanical component that is operable using a method in accordance with an exemplifying embodiment of the present invention.

FIG. 1 schematically depicts a portion of a micromechanical component that is operable using a method in accordance with an exemplifying embodiment of the present invention. The micromechanical component encompasses a drive electrode 1 and a further drive electrode 1' for deflecting an oscillation apparatus 3 that is deflectable parallel to a deflection direction 101. The micromechanical component furthermore encompasses a detection electrode 5 (not depicted in FIG. 1) and a further detection electrode 5' for detecting a force effect on oscillation apparatus 3 perpendicularly to deflection direction 101. The micromechanical component may be embodied in such a way that oscillation apparatus 3 is deflectable perpendicularly to deflection direction 101.

Figure 2:
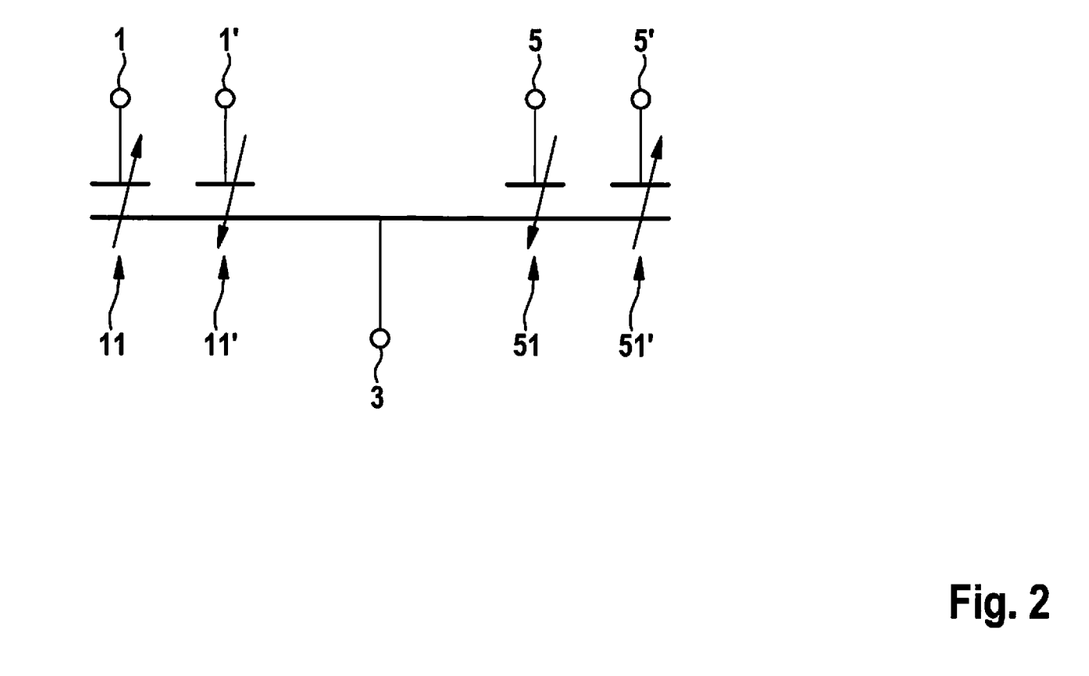
FIG. 2 schematically depicts a circuit assemblage, known from the existing art, for operating a micromechanical component.

FIG. 2 schematically depicts a circuit assemblage, known from the existing art, for operating a micromechanical component. The circuit assemblage encompasses a first capacitance 11, a second capacitance 11', a third capacitance 51, and a fourth capacitance 51'.

Figure 3:
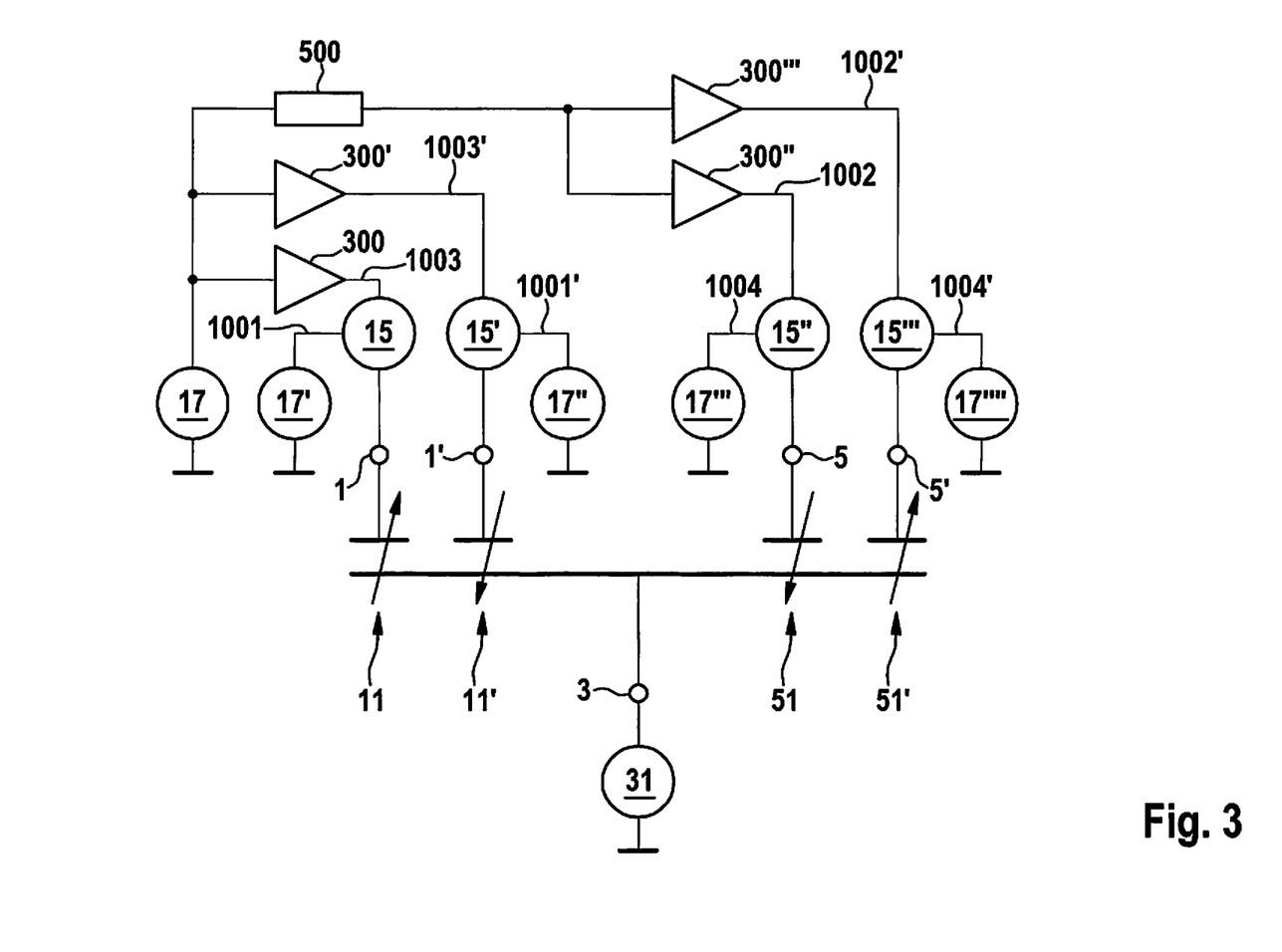
FIG. 3 schematically depicts a circuit assemblage for operating a micromechanical component, in accordance with an exemplifying embodiment of the present invention.
Figure 4:
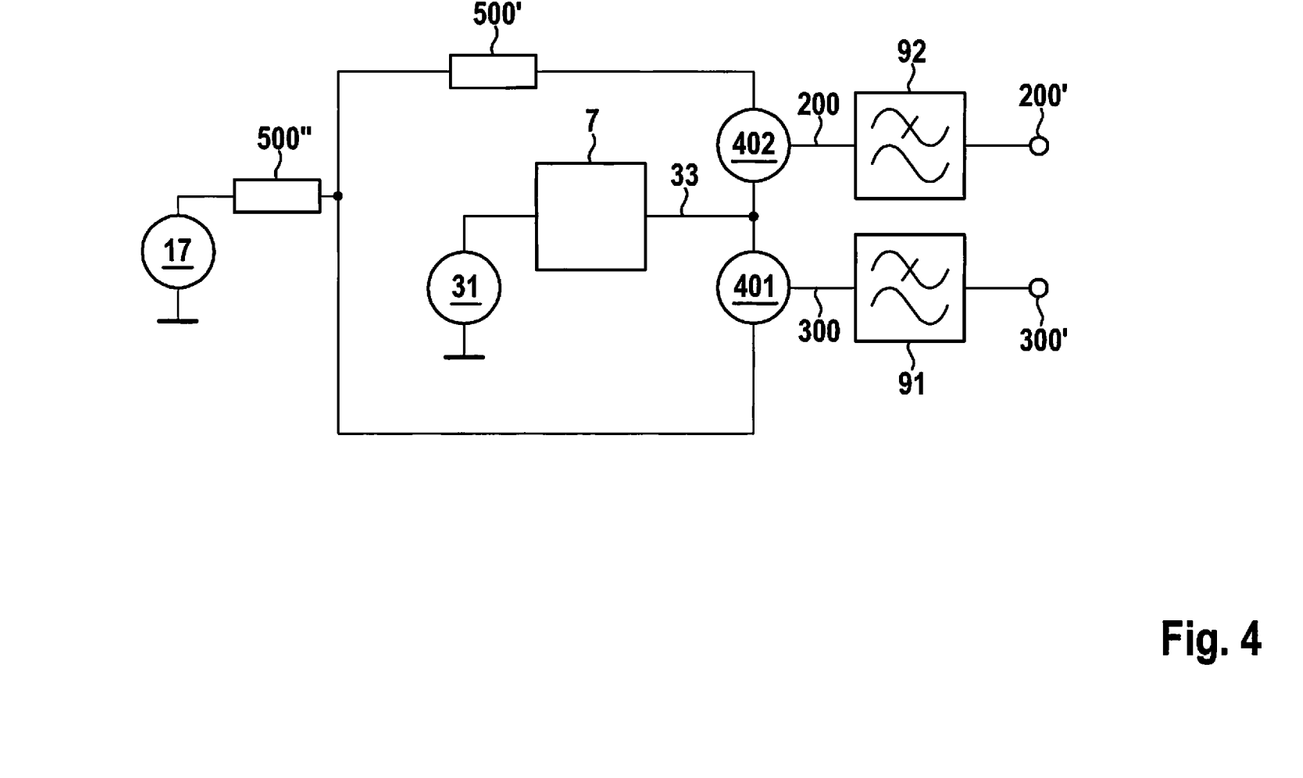
FIG. 4 schematically depicts a circuit assemblage for operating a micromechanical component, in accordance with an exemplifying embodiment of the present invention.

FIG. 3 schematically depicts a circuit assemblage for operating a micromechanical component, in accordance with an exemplifying embodiment of the present invention. In addition, FIG. 4 schematically depicts a circuit assemblage for operating a micromechanical component, in accordance with an exemplifying embodiment of the present invention.

Exemplifying embodiments of the method according to the present invention will be explained below with reference to the circuit assemblages depicted by way of example in FIG. 3 and FIG. 4.

In the method according to the present invention for operating a micromechanical component, in particular a rotation rate sensor, a first AC electrical voltage 1001, having a first frequency, is applied to a drive electrode 1 of the micromechanical component in such a way that an oscillation apparatus 3 of the micromechanical component is deflected parallel to a deflection direction 101 of drive electrode 1. In addition, a second AC electrical voltage 1002, having a second frequency, is applied to a detection electrode 5 of the micromechanical component in such a way that a force effect on oscillation apparatus 3 perpendicularly to deflection direction 101 is detected by detection electrode 5. In addition, in the method according to the present invention a third AC electrical voltage 1003, having a third frequency differing from the first frequency, is applied to drive electrode 1 in such a way that a deflection of oscillation apparatus 3 parallel to deflection direction 101 is detected by drive electrode 1; and/or a fourth AC electrical voltage 1004, having a fourth frequency differing from the second frequency, is applied to detection electrode 5 in such a way that a further force effect, acting oppositely to the force effect, is exerted on oscillation apparatus 3 by detection electrode 5.

The micromechanical component may be operated in such a way that the second frequency is identical to the third frequency. Alternatively or additionally, the micromechanical component is operated in such a way that the first frequency is identical to the fourth frequency.

In addition, a further first AC electrical voltage 1001', having the first frequency, may be applied to a further drive electrode 1' of the micromechanical component in such a way that oscillation apparatus 3 of the micromechanical component is deflected parallel to deflection direction 101 by further drive electrode 1'. In addition, a further second AC electrical voltage 1002', having the second frequency, may be applied to a further detection electrode 5' of the micromechanical component in such a way that the force effect on oscillation apparatus 3 perpendicularly to deflection direction 101 is detected by further detection electrode 5'. Furthermore, a further third AC electrical voltage 1003', having the third frequency, may be applied to further drive electrode 1' in such a way that the deflection of oscillation apparatus 3 parallel to deflection direction 101 is detected by further drive electrode 1'. In addition, a further fourth AC electrical voltage 1004', having the fourth frequency, may be applied to further detection electrode 5' in such a way that a third force effect, acting oppositely to the force effect, is exerted on oscillation apparatus 3 by further detection electrode 5'.

In addition, a current flow to oscillation apparatus 3 may be evaluated by an evaluation unit of the micromechanical component in such a way that the force effect on oscillation apparatus 3 perpendicularly to deflection direction 101 is ascertained. Furthermore, a current flow to oscillation apparatus 3 may be evaluated by an evaluation unit of the micromechanical component in such a way that the deflection of oscillation apparatus 3 parallel to deflection direction 101 is ascertained.

The circuit assemblage for operating a micromechanical component which is depicted by way of example in FIG. 3 and FIG. 4, in particular the circuit according to the present invention, is embodied in such a way that a first AC electrical voltage 1001, having a first frequency, is applicable to a drive electrode 1 of the micromechanical component in such a way that an oscillation apparatus 3 of the micromechanical component is deflected parallel to a deflection direction 101 by drive electrode 1. In addition, the circuit assemblage is embodied in such a way that a second AC electrical voltage 1002, having a second frequency, is applicable to a detection electrode 5 of the micromechanical component in such a way that a force effect on oscillation apparatus 3 perpendicularly to deflection direction 101 is detected by detection electrode 5. In addition, the circuit assemblage depicted by way of example in FIG. 3 and FIG. 4 is embodied in such a way that a third AC electrical voltage 1003, having a third frequency differing from the first frequency, is applicable to drive electrode 1 in such a way that a deflection of oscillation apparatus 3 parallel to deflection direction 101 is detected by drive electrode 1; and/or that a fourth AC electrical voltage 1004, having a fourth frequency differing from the second frequency, is applicable to detection electrode 5 in such a way that a further force effect, acting oppositely to the force effect, is exerted on oscillation apparatus 3 by detection electrode 5. Further embodiments, configurations, and functionalities of the circuit assemblage according to the present invention correspond to the features described in conjunction with the method according to the present invention.

A capacitive rotation rate sensor may be driven using the method according to the present invention, oscillation apparatus 3, or the seismic mass, being excited electrostatically, with the aid of comb electrodes or of a drive electrode 1 and further drive electrode 1' encompassing comb electrodes, to oscillate resonantly. The force acting at each electrode, or at drive electrode 1 and at further drive electrode 1', and at oscillation apparatus 3, may be $$F = \frac{1}{2}\frac{\partial C}{\partial x'}U^2, \quad (1)$$

where the force F points in drive direction x'. In this context, U is the applied voltage and C the capacitance with respect to the common electrode or to oscillation apparatus 3, or first capacitance 11 or second capacitance 11', where first capacitance 11 may be constituted by drive electrode 1 and oscillation apparatus 3, and second capacitance 11' may be constituted by further drive electrode 1' and oscillation apparatus 3. With the comb electrode assemblage depicted by way of example in FIG. 1, the voltages at drive electrode 1 ($U_1$) and at further drive electrode 1' ($U'_1$) may be selected so that the system or oscillation apparatus 3 experiences an oscillating net force having a resonant frequency, or the net force oscillating at the resonant frequency acts on oscillation apparatus 3. The directional derivative for comb electrodes may be described by $$\frac{\partial C}{\partial x'} = -\frac{2\varepsilon b}{g-h} = k, \quad (2)$$

where ε is the dielectric constant, b the width and h the length of a comb, and g an air gap between adjacent combs.

According to the present invention, the voltage profiles at the drive electrodes, or the voltages at drive electrode 1 ($U_1$) and at further drive electrode 1' ($U'_1$), may be $$U_1 = U_{12} + U_{13} \cos(\omega t) \tag{3},$$

$$U'_1 = -U_{12} + U_{13} \cos(\omega t) \tag{4}$$

or $$U'_1 = U_{12} - U_{13} \cos(\omega t) \tag{5},$$

where $U_{12}$ is a DC voltage, $U_{13}$ an amplitude of an AC voltage, and ω the angular frequency of the excitation. The resulting force acting on oscillation apparatus 3 may be $$F_1 - F'_1 = \tfrac{1}{2} k (U_1^2 - U'_1{}^2) = 2k U_{12} U_{13} \cos(\omega t) = \hat{F} \cos(\omega t) \tag{6}.$$

A variable capacitance C of comb electrodes or, at a first order, in particular for small deflections from the inactive position, of plate capacitors, may be described as follows:

$$C(x) = C_0 + \left. \frac{\partial C}{\partial x} \right|_{x=0} x, \tag{7}$$

where $C_0$ is the inactive capacitance for x=0 and (δC/δx) is the directional derivative in motion direction x, evaluated at the point x=0.

In the case of the drive electrodes, x'=x'(t) represents the drive motion of the rotation rate sensor. If a rotation rate is present, or if a rotation rate is applied to the micromechanical component, then those parts of the central mass, or of oscillation apparatus 3, which are located above the detection electrodes are also deflected around, under the influence of Coriolis force, out of the inactive position or perpendicularly to deflection direction 101. The micromechanical component may be embodied, or the MEMS rotation rate sensor is mechanically configured, in such a way that both the drive motion or the deflection parallel to deflection direction 101, and the detection motion or the deflection perpendicular to deflection direction 101 execute a counter-phase oscillation with respect to the corresponding electrode or electrodes. In other words, oscillation apparatus 3 may be deflected toward drive electrode 1 and away from further drive electrode 1' in a first time interval, and away from drive electrode 1 and toward further drive electrode 1' in a second time interval. In addition, oscillation apparatus 3 may be deflected toward detection electrode 5 and away from further detection electrode 5' in a third time interval, and away from detection electrode 5 and toward further detection electrode 5' in a fourth time interval, which in each case may be in the direction of the force effect. The time intervals, may overlap in this context, except that the first time interval and the second time interval, and the third time interval and the fourth interval, do not overlap. Written out, this may respectively mean:

$$C_{11}(x') = C'_0 + \left. \frac{\partial C}{\partial x'} \right|_{x'=0} x' \tag{9}$$

and $$C'_{11}(x') = C'_0 - \left. \frac{\partial C}{\partial x'} \right|_{x'=0} x', \tag{10}$$

and $$C_{51}(x'') = C''_0 + \left. \frac{\partial C}{\partial x''} \right|_{x''=0} x'' \tag{11}$$

and $$C'_{51}(x'') = C''_0 - \left. \frac{\partial C}{\partial x''} \right|_{x''=0} x'', \tag{12}$$

it being assumed that the capacitances exhibit the same quiescent capacitance $C_0$ (of the corresponding electrode), and the same directional derivative, for first capacitance 11 and second capacitance 11' parallel to deflection direction 101 (x') and for third capacitance 51 and fourth capacitance 51' perpendicular to deflection direction 101 (x''). The quiescent capacitance of first capacitance 11 therefore may correspond to the quiescent capacitance of second capacitance 11', and the quiescent capacitance of third capacitance 51 to the quiescent capacitance of fourth capacitance 51'.

FIG. 2 depicts, by way of example, an equivalent electrical circuit diagram for a single-channel rotation rate sensor; arrows indicate the counter-phase change in the identical-magnitude drive and detection capacitances, or in first capacitance 11, second capacitance 11', third capacitance 51, and fourth capacitance 51'.

Exemplary embodiments of the method according to the present invention and of the circuit assemblage according to the present invention are described below using the example of a single-channel rotation rate sensor; according to the present invention, the method according to the present invention and the circuit assemblage according to the present invention is applicable, in correspondingly expanded fashion, to two-channel and three-channel rotation rate sensors.

A respective capacitance change $\Delta C_{11}$ or $\Delta C_{51}$, which is proportional respectively to the mechanical motion of the drive detection electrodes and rotation rate detection electrodes, results from the difference respectively between equations (9) and (10), and (11) and (12):

$$2\Delta C_{11} = C_{11} - C'_{11} \tag{13}$$

and $$2\Delta C_{51} = C_{51} - C'_{51} \tag{14}.$$

The counterelectrodes, or drive electrode 1, further drive electrode 1', detection electrode 5, and further detection electrode 5', may each be impinged upon by a voltage in order to sense the mechanical motion or deflection of oscillation apparatus 3 parallel and perpendicularly to deflection direction 101 by way of a current measurement at the deflection apparatus electrode or at the deflection apparatus. In this context, oscillation apparatus 3 may encompass an electrode, or oscillation apparatus 3 is embodied in such a way that oscillation apparatus 3 is usable as an electrode. The current flow through a capacitor is described in general by the equation:

$$i(t) = \frac{dQ}{dt} = \frac{d(C \cdot U)}{dt}. \tag{15}$$

According to the present invention, the resulting current flow 31, and particularly current flow 31 measured at oscillation apparatus 3, may be described by:

$$i_{31}(t) = \frac{d(C_{11}U_1 + C'_{11}U'_1 + C_{51}U_5 + C'_{51}U'_5)}{dt}. \quad (16)$$

In addition, the voltages may be selected as follows:

$$U_1 = U_{300}\cos(\Omega t) \quad (17),$$

$$U'_1 = -U_{300}\cos(\Omega t) \quad (18),$$

$$U_5 = U_{200}\sin(\Omega t) \quad (19),$$

$$U'_5 = -U_{200}\sin(\Omega t) \quad (20),$$

where $U_5$ is the voltage at detection electrode 5 and $U'_5$ is the voltage at further detection electrode 5'.

Inserting the expressions of equations (17) to (20) into equation (16), and integrating equation (16) over time, which may be carried out by an integrator 7 depicted by way of example in FIG. 4, integrator 7 may encompass analog and/or digital electronics, results in $$I_{33}(t) = U_{200}\sin(\Omega t)(C_{51} - C'_{51}) + U_{300}\cos(\Omega t)(C_{11} - C'_{11}) \quad (21)$$
$$= 2U_{200}\Delta C_{51}\sin(\Omega t) + 2U_{300}\Delta C_{11}\cos(\Omega t)..$$

Multiplying $I_{33}(t)$ respectively by $\sin(\Omega t)$ or by $\cos(\Omega t)$ yields the following two expressions:

$$I_{300}(t) = I_{33}(t)\cos(\Omega t) = U_{300}\Delta C_{11} + U_{300}\Delta C_{11}\cos(2\Omega t) + U_{200}\Delta C_{51}\sin(\Omega t) \quad (22)$$

and $$I_{200}(t) = I_{33}(t)\sin(\Omega t) = U_{200}\Delta C_{51} + U_{200}\Delta C_{51}\cos(2\Omega t) + U_{300}\Delta C_{11}\sin(2\Omega t) \quad (23).$$

FIG. 4 illustrates by way of example that the cosinusoidal voltage profile $\cos(\Omega t)$ furnished by voltage source 17 is converted, with a further phase shift 500', into a sinusoidal voltage profile $\sin(\Omega t)$. According to the present invention a phase shift produces a phase jump or a phase displacement. FIG. 4 furthermore shows a third phase shift 500", the cosinusoidal voltage profile $\cos(\Omega t)$ furnished by voltage source 17 being further convertible with the third phase shift. FIG. 4 also illustrates that the cosinusoidal voltage profile $\cos(\Omega t)$ furnished by voltage source 17, and signal 33 furnished by integrator 7, are mixed by a first mixer 401, and signal 300 is furnished by first mixer 401. FIG. 4 further depicts the fact that the sinusoidal voltage profile $\sin(\Omega t)$, and signal 33 furnished by integrator 7, are mixed by a second mixer 402, and signal 200 is furnished by second mixer 402.

According to the present invention, those terms which, in equations (22) and (23), are proportional to $\sin(2\Omega t)$ and $\cos(2\Omega t)$ may be ignored. Those terms may be electronically filtered out of signals 200 and 300 in analog or digital fashion by low-pass filtering or by a first low-pass filter 91 and a second low-pass filter 92. In other words, first low-pass filter 91 and/or second low-pass filter 92 respectively encompasses an analog and/or digital filter apparatus. A first signal 200' and a second signal 300' thus may be furnished according to the present invention, first signal 200' and second signal 300' respectively being proportional to the change in capacitance of the corresponding electrode pair, or proportional to the respective change in capacitance $\Delta C_{51}$ and $\Delta C_{11}$.

In addition, first AC electrical voltage 1001 and third AC electrical voltage 1003 may be applied, which may be additively, to drive electrode 1; and further first AC electrical voltage 1001' and further third AC electrical voltage 1003' are applied, which may be additively, to further drive electrode 1'. In addition, second AC electrical voltage 1002 and fourth AC electrical voltage 1004 may be applied, which may be additively, to detection electrode 5; and further second AC electrical voltage 1002' and further fourth AC electrical voltage 1004' are applied, which may be additively, to further detection electrode 5'. In conjunction with the present invention, the application of two AC voltages signifies a superimposition, which may be a superimposition that is additive by way of a summation point 15, 15', 15", 15''', of the two AC voltages.

First AC electrical voltage 1001 may be $$U_{1001} = U_{12} + U_{13}\cos(\omega t) \quad (24).$$

In addition, third AC electrical voltage 1003 may be $$U_{1003} = U_{300}\cos(\Omega t) \quad (25).$$

In this context, the cosinusoidal voltage profile $\cos(\Omega t)$ furnished by voltage source 17 may be multiplied by $U_{300}$ using an amplifier 300.

The voltage at drive electrode 1 furthermore may be $$U_1 = U_{12} + U_{13}\cos(\omega t) + U_{300}\cos(\Omega t) \quad (26).$$

First AC electrical voltage 1001' furthermore may be $$U'_{1001} = -U_{12} + U_{13}\cos(\omega t) \quad (27)$$

or $$U'_{1001} = U_{12} - U_{13}\cos(\omega t) \quad (28),$$

and further third AC electrical voltage 1003' may be $$U'_{1003} = -U_{300}\cos(\omega t) \quad (29).$$

In this context, the cosinusoidal voltage profile $\cos(\Omega t)$ furnished by voltage source 17 may be multiplied by $-U_{300}$ using a further amplifier 300'.

The voltage at further drive electrode 1' furthermore may be $$U'_1 = -U_{12} + U_{13}\cos(\omega t) - U_{300}\cos(\Omega t) \quad (30)$$

or $$U'_1 = U_{12} - U_{13}\cos(\omega t) - U_{300}\cos(\Omega t) \quad (31).$$

The result is, advantageously, a reduced number of drive detection electrodes.

Second AC electrical voltage 1002 furthermore may be $$U_{1002} = U_{200}\sin(\Omega t) \quad (32).$$

Firstly the cosinusoidal voltage profile $\cos(\Omega t)$ furnished by voltage source 17 may be converted, with a phase shift 500, into a sinusoidal voltage profile $\sin(\Omega t)$, and multiplied by $U_{200}$ using a third amplifier 300". Further second AC electrical voltage 1002' may be $$U'_{1002} = -U_{200}\sin(\Omega t) \quad (33),$$

the sinusoidal voltage profile $\sin(\Omega t)$ furnished by phase shift 500 may be multiplied by $-U_{200}$ using a fourth amplifier 300'''. In addition, the voltage at detection electrode 5 and the voltage at further detection electrode 5' respectively may be $$U_5 = U_{200}\sin(\Omega t) + U_{1004} \quad (34)$$

and $$U'_5 = -U_{200} \sin(\Omega t) + U'_{1004} \quad (35),$$

$U_{1004}$ and $U'_{1004}$ respectively being fourth AC electrical voltage 1004 and further fourth AC electrical voltage 1004'. The advantageous result is a reduced number of force feedback electrodes.

FIG. 3 shows, by way of example, an interconnection, or a circuit assemblage according to the present invention, of a single-channel rotation rate sensor, which can be operated with a method according to the present invention, a reduced number of drive detection elements being possible. FIG. 3 depicts by way of example the fact that the circuit assemblage encompasses a voltage source 17, which may be for furnishing a cosinusoidal voltage profile having a carrier frequency $\Omega$ and an amplitude of 1 V. FIG. 3 also shows by way of example that the circuit assemblage encompasses a further voltage source 17', a third voltage source 17", a fourth voltage source 17''', and a fifth voltage source 17''''. Further voltage source 17' and third voltage source 17" respectively may furnish first AC electrical voltage 1001 and further AC electrical voltage 1001', which may be used respectively for force generation at drive electrode 1 and for force generation at further drive electrode 1'. In addition, fourth voltage source 17''' and fifth voltage source 17'''' respectively may furnish fourth AC electrical voltage 1004 and further fourth AC electrical voltage 1004', which may be used respectively for force generation at detection electrode 5 and for force generation at further detection electrode 5'.

FIG. 4 shows by way of example the circuit assemblage or an evaluation unit of the circuit assemblage, which may be for or as part of a single-channel rotation rate sensor; current flow 31 or total current 31, which is measured respectively at the electrode of oscillation apparatus 3 or at oscillation apparatus 3, is respectively demodulated or the current flow is evaluated with a demodulation. According to the present invention, the circuit assemblage may encompass the evaluation unit. FIG. 4 depicts voltage source 17 by way of example, the cosinusoidal voltage profile, having the carrier frequency $\Omega$ and furnished by voltage source 17, which may be used for demodulation. The circuit arrangement may encompass analog and/or digital and/or mixed analog-digital electronics. In other words, the method according to the present invention may be carried out using analog and/or digital and/or mixed analog-digital electronics. According to the present invention, oscillation apparatus 3 may be a counter-electrode for drive electrode 1, for further drive electrode 1', for detection electrode 5, and for further detection electrode 5'.

The circuit assemblage according to the present invention may encompass an ASIC, the current through oscillation apparatus 3 being measured by the ASIC. In other words, the circuit assemblage depicted by way of example in FIG. 4, or the evaluation unit depicted by way of example in FIG. 4, is embodied as an ASIC. The circuit assemblage according to the present invention furthermore may encompass a further ASIC, the further ASIC encompassing voltage source 17, further voltage source 17', third voltage source 17", fourth voltage source 17''', and/or fifth voltage source 17''''. The circuit assemblage according to the present invention furthermore encompasses a third ASIC, the third ASIC having several demodulators. The circuit arrangement according to the present invention furthermore may encompass a fourth ASIC, the voltages necessary for electrostatic force generation being generated by the fourth ASIC.

The method according to the present invention and the circuit assemblage according to the present invention are advantageous in particular with respect to other methods and circuit assemblages used for ascertaining a change in capacitance over time, for example the baseband method and the carrier frequency method, since with the method according to the present invention and the circuit assemblage according to the present invention it is advantageously possible to dispense with additional drive detection electrodes on the seismic mass and, for each electrode, with a corresponding number of converter sections in the ASIC.

In the so-called "baseband" method, a DC voltage is applied to the corresponding electrode, and the displacement current at the electrode itself, produced as a result of the change in capacitance, is measured. As a rule, one current-voltage converter per electrode is required here. In the so-called "carrier frequency" method, an AC voltage having a frequency (the so-called "carrier frequency," which is set to be as high as possible with respect to the resonant frequency) is fed in via the common electrode. Here the change in capacitance results in an amplitude modulation of the current flowing at the corresponding electrode. Conversion to a voltage signal is achieved here, as a rule, via a so-called "capacitance-voltage" converter.

Further advantages of the present invention are, in particular:
reduction in MEMS area, since the drive detection electrodes are omitted.
Alternatively: enlargement of the drive combs, which results in lower drive voltages.
Reduced number of pads between MEMS and ASIC;
reduced number of bonding wires between MEMS and ASIC;
  both result in a reduction in costs and in parasitic capacitance.
No capacitive crosstalk between drive electrodes and drive detection electrodes.
Reduced number of converter sections in the ASIC, since only one converter section on the CM electrode is needed.
For a single-channel rotation rate sensor, only one carrier frequency is required.
For a three-channel rotation rate sensor, the drive motion and all three rotation rate signals can be read out simultaneously using two carrier frequencies.
Reduced number of conversion sections:
  results in a less expensive ASIC
  lower power consumption.

What is claimed is:

1. A method for operating a micromechanical component, the method comprising:
   applying a first AC electrical voltage, having a first frequency, to a drive electrode of the micromechanical component so that an oscillation apparatus of the micromechanical component is deflected parallel to a deflection direction by the drive electrode;
   applying a second AC electrical voltage, having a second frequency, to a detection electrode of the micromechanical component so that a force effect on the oscillation apparatus perpendicularly to the deflection direction is detected by the detection electrode; and
   performing the following:
      (i) applying a third AC electrical voltage, having a third frequency differing from the first frequency, to the drive electrode so that a deflection of the oscillation apparatus parallel to the deflection direction is detected by the drive electrode; and
      (ii) applying a fourth AC electrical voltage, having a fourth frequency differing from the second frequency, to the detection electrode so that a further force effect, acting oppositely to the force effect, is exerted on the oscillation apparatus by the detection electrode.

2. The method of claim 1, wherein a fifth AC electrical voltage, having the first frequency, is applied to a further drive electrode of the micromechanical component so that the oscillation apparatus of the micromechanical component is deflected parallel to the deflection direction by the further drive electrode.

3. The method of claim 1, wherein a sixth AC electrical voltage, having the second frequency, is applied to a further detection electrode of the micromechanical component so that the force effect on the oscillation apparatus perpendicular to the deflection direction is detected by the further detection electrode.

4. The method of claim 1, wherein a seventh AC electrical voltage, having the third frequency, is applied to a further drive electrode so that the deflection of the oscillation apparatus parallel to the deflection direction is detected by the further drive electrode.

5. The method of claim 1, wherein an eighth AC electrical voltage, having the fourth frequency, is applied to a further detection electrode so that a third force effect, acting oppositely to the force effect, is exerted on the oscillation apparatus by the further detection electrode.

6. The method of claim 1, wherein a current flow to the oscillation apparatus is evaluated by an evaluation unit of the micromechanical component so that the force effect on the oscillation apparatus perpendicularly to the deflection direction is ascertained.

7. The method of claim 1, wherein a current flow to the oscillation apparatus is evaluated by an evaluation unit of the micromechanical component so that the deflection of the oscillation apparatus parallel to the deflection direction is ascertained.

8. The method of claim 1, wherein the micromechanical component is a rotation rate sensor.

9. A method for operating a micromechanical component, the method comprising:
applying a first AC electrical voltage, having a first frequency, to a drive electrode of the micromechanical component so that an oscillation apparatus of the micromechanical component is deflected parallel to a deflection direction by the drive electrode;
applying a second AC electrical voltage, having a second frequency, to a detection electrode of the micromechanical component so that a force effect on the oscillation apparatus perpendicularly to the deflection direction is detected by the detection electrode; and
performing at least one of the following:
(i) applying a third AC electrical voltage, having a third frequency differing from the first frequency, to the drive electrode so that a deflection of the oscillation apparatus parallel to the deflection direction is detected by the drive electrode; or
(ii) applying a fourth AC electrical voltage, having a fourth frequency differing from the second frequency, to the detection electrode so that a further force effect, acting oppositely to the force effect, is exerted on the oscillation apparatus by the detection electrode,
wherein the micromechanical component is operated so that the second frequency is identical to the third frequency.

10. A method for operating a micromechanical component, the method comprising:
applying a first AC electrical voltage, having a first frequency, to a drive electrode of the micromechanical component so that an oscillation apparatus of the micromechanical component is deflected parallel to a deflection direction by the drive electrode;
applying a second AC electrical voltage, having a second frequency, to a detection electrode of the micromechanical component so that a force effect on the oscillation apparatus perpendicularly to the deflection direction is detected by the detection electrode; and
performing at least one of the following:
(i) applying a third AC electrical voltage, having a third frequency differing from the first frequency, to the drive electrode so that a deflection of the oscillation apparatus parallel to the deflection direction is detected by the drive electrode; or
(ii) applying a fourth AC electrical voltage, having a fourth frequency differing from the second frequency, to the detection electrode so that a further force effect, acting oppositely to the force effect, is exerted on the oscillation apparatus by the detection electrode,
wherein the micromechanical component is operated so that the first frequency is identical to the fourth frequency.

11. A circuit assemblage for operating a micromechanical component, comprising:
a circuit assembly configured to perform the following:
(i) applying a first AC electrical voltage, having a first frequency, via a voltage device, to a drive electrode of the micromechanical component so that an oscillation apparatus of the micromechanical component is deflected parallel to a deflection direction by the drive electrode; and
(ii) applying a second AC electrical voltage, having a second frequency, via the voltage device, to a detection electrode of the micromechanical component so that a force effect on the oscillation apparatus perpendicularly to the deflection direction is detected by the detection electrode,
wherein the circuit assembly is further configured to perform the following:
(iii) applying a third AC electrical voltage, having a third frequency differing from the first frequency, via the voltage device, to the drive electrode so that a deflection of the oscillation apparatus parallel to the deflection direction is detected by the drive electrode; and
(iv) applying a fourth AC electrical voltage, having a fourth frequency differing from the second frequency, via the voltage device, to the detection electrode so that a further force effect, acting oppositely to the force effect, is exerted on the oscillation apparatus by the detection electrode.

12. The circuit assemblage of claim 11, wherein the micromechanical component is a rotation rate sensor.

* * * * *